United States Patent
Shibata et al.

(10) Patent No.: US 6,998,957 B2
(45) Date of Patent: Feb. 14, 2006

(54) SECURITY SYSTEM OF CONSTRUCTION MACHINERY

(75) Inventors: Koichi Shibata, Ibaraki (JP); Kiyoshi Ono, Tokyo (JP); Genroku Sugiyama, Ibaraki (JP); Osamu Tomikawa, Tokyo (JP); Hiroyuki Adachi, Ibaraki (JP); Hideo Karasawa, Ibaraki (JP); Toichi Hirata, Ibaraki (JP); Hiroshi Watanabe, Ibaraki (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 275 days.

(21) Appl. No.: 10/297,176

(22) PCT Filed: Apr. 2, 2002

(86) PCT No.: PCT/JP02/03307

§ 371 (c)(1),
(2), (4) Date: Dec. 3, 2002

(87) PCT Pub. No.: WO02/081270

PCT Pub. Date: Oct. 17, 2002

(65) Prior Publication Data

US 2003/0137398 A1    Jul. 24, 2003

(30) Foreign Application Priority Data

Apr. 5, 2001  (JP)  .............. 2001-107464
Apr. 25, 2001 (JP)  .............. 2001-127128

(51) Int. Cl.
  *B60R 25/00*  (2006.01)
  *G05B 19/00*  (2006.01)
  *H04Q 1/00*  (2006.01)

(52) U.S. Cl. .............. 340/5.28; 340/5.72; 307/9.1; 307/10.3

(58) Field of Classification Search .............. 340/5.28, 340/5.72, 5.22, 5.25; 307/9.1, 10.1, 10.2, 307/10.3, 10.5
See application file for complete search history.

(56) References Cited

U.S. PATENT DOCUMENTS

| | | | |
|---|---|---|---|
| 5,619,573 A * | 4/1997 | Brinkmeyer et al. | 340/5.27 |
| 5,838,251 A | 11/1998 | Brinkmeyer et al. | |
| 5,917,405 A * | 6/1999 | Joao | 340/5.72 |
| 5,969,633 A * | 10/1999 | Rosler | 340/5.25 |
| 6,161,005 A * | 12/2000 | Pinzon | 340/5.72 |
| 2002/0084887 A1* | 7/2002 | Arshad et al. | 340/5.72 |

FOREIGN PATENT DOCUMENTS

DE  197 53 401 A1  6/1999

(Continued)

*Primary Examiner*—Brian Zimmerman
*Assistant Examiner*—Clara Yang
(74) *Attorney, Agent, or Firm*—Sughrue Mion, PLLC

(57) ABSTRACT

A security system for a construction machine including a construction machine equipped with a body controller for storing a first password, management apparatus arranged in a location apart from the construction machine and a portable communications unit for storing a second password provided communicably with the management apparatus and the body controller. The portable communications unit, receiving the first password from the management apparatus, replaces the second password with the first password. The body controller determines whether the second password output from the portable communications unit coincides with the first password. In case these passwords coincide with each other, an engine drive signal is output. Otherwise the engine is kept inoperable. This prevents possible theft of a construction machine.

12 Claims, 8 Drawing Sheets

FOREIGN PATENT DOCUMENTS

| | | |
|---|---|---|
| JP | 10-54166 | 2/1998 |
| JP | 2000-129977 | 5/2000 |
| JP | 3099642 | 8/2000 |
| JP | 2000-335370 | 12/2000 |
| JP | 2000-345747 | 12/2000 |
| JP | 2001-82010 | 3/2001 |

* cited by examiner

SECURITY SYSTEM OF CONSTRUCTION MACHINERY

TECHNICAL FIELD

The present invention relates to a security system for a construction machine provided on a construction machine such as a hydraulic excavator, the security system for preventing theft of the construction machine by permitting operation of the construction machine only when a predetermined password is entered.

BACKGROUND ART

Recently, there has been frequent theft of a construction machine such as a hydraulic excavator. Under such a situation, a variety of security systems have been proposed for a construction machine.

According to a technology described in JP-B-2642455, operation of a start blocking section for an engine start system is released only when a predetermined password is entered to a key input device in an appropriate order thus permitting operation of a construction machine, thereby disabling operation by a third party who does not know the password and preventing theft of the construction machine.

Japanese Patent Laid-Open No. 44938/1998 proposes a security system capable of arbitrarily setting or erasing a password by using a special magnetic rod.

According to a security system described in Japanese Patent Laid-Open No. 50584/1997, for example, when a predetermined personal identification number is entered from a key input device, a pilot hydraulic source communicates with a pilot valve to permit operation of hydraulic apparatus, while the pilot hydraulic source and the pilot valve are blocked from each other to inhibit the operation of the hydraulic apparatus when the personal identification number is not input or a wrong number is entered. An IC card may be inserted instead of key input to permit operation of the hydraulic apparatus.

According to a security system described in Japanese Patent Laid-Open No. 301072/1996, for example, in case where a predetermined personal identification number is not input from a key input device, a starter circuit is not activated by a starting operation and starting of the engine is inhibited.

In general, for a construction machine such as a hydraulic excavator, there are often cases where a third party other than a regular operator of the construction machine is obliged to operate the construction machine. For example, in case where a construction machine is transported between work sites apart from each other, the construction machine is conveyed on a trailer. In this case, loading/unloading of a construction machine onto/out of a trailer is often carried out by a handler such as a delivery agent or a maintenance person, not an operator of the construction machine.

In case such a third party operates a construction machine equipped with a security system described in the aforementioned documents, the operator of the construction machine must give the password to the handler as required. However, presenting a password to a third party leads to leakage of a password, causing a serious security problem.

According to a related art technology described in the Japanese Patent Laid-Open No. 44398/1998, setting of a new password is made possible by inserting a magnetic rod. This allows a password given to a handler other than an operator to be changed afterwards using the magnetic rod. Such change of a password prevents leakage of the password. However, frequent change of a password is not favorable because it is cumbersome to an operator and may confuse the operator.

According to security systems described in the Japanese Patent Laid-Open No. 50584/1997 and the Japanese Patent Laid-Open No. 301072/1996, a key input device or card reader dedicated to a construction machine must be installed. This results in additional costs.

The problem with the related art technology described in the aforementioned documents is that input of a password is made by a site worker such as an operator or handler of the construction machine.

DISCLOSURE OF INVENTION

The invention has been proposed in view of the situation of the related art technology, and aims at providing a security system for a construction machine which enables a password input processing to allow driving of the construction machine without intervention of a site worker such as an operator or a handler of the construction machine.

According to the invention, the following security system for a construction machine is provided.

1. A security system for a construction machine comprising a construction machine equipped with a body controller for storing a first password and a portable communications unit for storing a second password, characterized in that the body controller determines whether the second password output from the portable communications unit coincides with the first password and inhibits a predetermined operation of the construction machine in the case of unmatch between the passwords.

2. A security system for a construction machine arranged in a location apart from the construction machine, the system comprising management apparatus for storing the first password being communicable with the body controller and the portable communications unit, the portable communications unit, on receiving the first password from the management apparatus, changes the second password to the first password.

3. A security system for a construction machine characterized in that the predetermined operation of the construction machine is starting the engine installed on the construction machine, the construction machine comprises an engine start instruction section for instructing the body controller to start the engine, the management apparatus comprises an input section for receiving a communication signal output from the portable communications unit, a database for storing the first password, an arithmetic operation section for selecting the first password stored in the database in accordance with a communication signal received by the input section, and an output section for outputting the first password selected by the arithmetic operation section, the portable communications unit is owned by an operator of the construction machine and comprises a first output section for outputting the communication signal to the management apparatus, a first input section for receiving the first password output from the management apparatus, a memory for storing the first password received by the first input section as a second password, and a second output section for outputting the second password to the body controller, the body controller of the construction machine comprises a memory for storing in advance the first password stored in the database of the management apparatus, an input section for receiving the second password output from the second output section of the portable communications unit, an arithmetic operation section for determining whether the second password output from the second output section of the portable communications unit coincides with the first password stored in the memory of the body controller and outputting an engine drive permission signal when matching is made, and an engine start controller for outputting an engine drive signal in accordance with the engine drive permission signal output from the arithmetic operation section.

4. A security system for a construction machine characterized in that the portable communications unit further comprises a second input section for receiving a predetermined request signal output from the body controller and an arithmetic operation section for reading the second password stored in the memory of the portable communications unit in accordance with the request signal output from the body controller, the body controller further comprises an output section for outputting the request signal to the second input section of the portable communications unit, the arithmetic operation section provided on the body controller performs processing to output the request signal in accordance with a signal output from the engine start instruction section for outputting an engine drive signal in accordance with the engine drive permission signal output from the arithmetic operation section.

5. A security system for a construction machine characterized in that the engine start instruction section is a key switch for detecting insertion of an engine key.

6. A security system for a construction machine characterized in that the portable communications unit is a cell phone and that the management apparatus comprises a database for storing the telephone number of the cell phone and the first password in relation to each other.

7. A security system for a construction machine characterized in that the first password is a dated password with a predetermined expiration date, the body controller comprises a clock, the arithmetic operation section of the body controller determines whether the dated password is valid or invalid based on the date and time indicated by the clock and inhibits starting of the engine when the arithmetic operation section has determined that the dated password is invalid.

8. A security system for a construction machine characterized in that the management apparatus comprises a database for storing the telephone number of the cell phone, the work schedule of the owner of the cell phone and the first password in relation to each other, and an arithmetic operation section for reading the work schedule of the owner related to the telephone number stored in the database of the management apparatus in accordance with the telephone number of the cell phone recognized based on a communication signal input from the input section of the management apparatus and setting a dated password having an expiration date corresponding to the work schedule.

9. A security system for a construction machine characterized in that the management apparatus comprises a database for storing the telephone number of the cell phone, the work schedule of the owner of the cell phone, the operation schedule of the construction machine and the first password in relation to each other, and an arithmetic operation section for reading the work schedule of the owner and the operation schedule of the construction machine related to the telephone number stored in the database of the management apparatus in accordance with the telephone number of the cell phone recognized based on a communication signal input from the input section of the management apparatus, determining an expiration date based on both the work schedule of the owner and the operation schedule of the construction machine and setting a dated password corresponding to the expiration date.

10. A security system for a construction machine comprising a plurality of portable communications units, characterized in that the management apparatus stores a plurality of first passwords.

11. A security system for a construction machine characterized in that the portable communications unit and the management apparatus perform communications via a public telephone circuit.

12. A security system for a construction machine characterized in that the portable communications unit is a cell phone and stores the telephone number of the cell phone as a second password.

13. A security system for a construction machine characterized in that the second password is data keyed into the operation section of the portable input device.

14. A security system for a construction machine characterized in that the portable communications unit and the body controller performs communications via a serial interface.

15. A security system for a construction machine characterized in that the portable communications unit and the body controller performs wireless communications.

The body controller of a construction machine stores a first password. The portable communications unit stores a second password. The processing may be done just before or several days before operation of the construction machine.

When an operator or a sire worker other than the operator such as a handler operates a construction machine, he/she has only to connect a portable communications unit to the body controller of the construction machine via communications. This allows the first password stored in the portable communications unit to be sent to the body controller.

The body controller compares the second password received with the first password stored in the body controller, and when the passwords coincide with each other, outputs an engine drive signal. This drives the engine, allowing work by the construction machine. In case these passwords do not coincide, the engine drive signal is not output and the engine is kept inoperable thus driving of the construction machine is inhibited. As a result, the construction machine cannot be run. Passwords may be used in this way to prevent possible theft of a construction machine.

The portable communications unit, receiving a first password stored in the management apparatus arranged in a location apart from a construction machine via communications, stores the first password received as a second password.

It is thus possible to implement automatic and remote-controlled input processing of passwords to drive a construction machine without intervention of a site worker such as an operator or a handler.

A communication signal output from the first output section of a portable communications unit owned by an operator of a construction machine is input to the arithmetic operation section of management apparatus via the input section of the management apparatus. The arithmetic operation section of the management apparatus reads a first password stored in a database based on the input communication signal. The first password is sent from the arithmetic operation section to the output section of the management apparatus, and sent from the output section via communications. The predetermined password thus sent is entered to the arithmetic operation section of the portable communications unit from the input section of the portable communications unit and stored into a memory as a second password.

When a site worker such as an operator or a handler operates a construction machine, he/she has only to connect a portable communications unit to the body controller of the construction machine via communications, and operate the engine start instruction section. When the portable communications unit is connected to then body controller via communications, the second password is sent out from then second output section of the cell phone and received by the input section of the body controller then input to the arithmetic operation section of the body controller. The arithmetic operation section compares the second password received with the first password stored in the memory of the arithmetic operation section, and when the passwords coincide with each other, outputs an engine drive permission signal to an engine start controller. This causes the engine start controller to output an engine drive signal, which drives the engine, allowing work by the construction machine. In case these passwords do not coincide in the comparison of passwords, the engine drive permission signal is not output from the arithmetic operation section. Thus an engine drive signal is not output from the engine start controller and the engine is kept inoperable and driving of the construction machine is inhibited. Thus the construction machine cannot be run. Passwords may be used in this way to prevent possible theft of a construction machine.

Thus, by operating an engine start instruction section with a portable communications unit connected to a body controller after signal transmission between the portable communications unit and management apparatus, it is possible to implement automatic and remote-controlled input processing of passwords to drive a construction machine without intervention of a site worker such as an operator or a handler.

When an engine key is inserted with the portable communications unit connected to the body controller, an instruction signal output from the key switch is input to the arithmetic operation section of the body controller. The arithmetic operation section generates a request signal in accordance with the instruction signal output from the key switch and causes the portable communications unit to output the request signal.

When a call is placed from a cell phone to management apparatus, the arithmetic operation section of the management apparatus recognizes the telephone number of the cell phone and reads the first password corresponding to the telephone number from the database. A call is placed from the management apparatus to the telephone number, the first password read out is sent to the cell phone and is stored into the memory of the cell phone.

When the telephone number of the cell phone is recognized by the arithmetic operation section of the management apparatus, a first dated password corresponding to the telephone number may be read from the database and sent to the cell phone, then stored into memory as a second dated password.

In this case, when the cell phone is connected to the body controller and the engine start instruction section is operated, the second dated password stored in the memory of the cell phone is sent to the body controller. The arithmetic operation section of the body controller compares for example the second dated password sent with the first password stored in the memory of the body controller, and when the passwords coincide with each other, checks whether the expiration date of the second dated password sent includes the date and time indicated by the clock, and determines that the password is valid, then outputs an engine drive permission signal to an engine start controller. In case the second dated password sent and the first password stored in the memory of the body controller do not coincide or the expiration date of the dated password sent does not include the date and time indicated by the clock and determined invalid, the engine drive permission signal is not output.

When the telephone number of the cell phone is recognized by the arithmetic operation section of the management apparatus, a first predetermined password corresponding to the telephone number and the work schedule of the owner of the cell phone may be read from the database and a first dated password having an expiration date as a term corresponding to the work schedule may be set. The first dated password thus set is sent to the cell phone and stored in the memory of the cell phone as a second password.

When the telephone number of the cell phone is recognized by the arithmetic operation section of the management apparatus, a first predetermined password corresponding to the telephone number, work schedule of the owner of the cell phone and the operation schedule of the construction machine are read and an expiration date is determined based on both the work schedule of the owner and the operation schedule of the construction machine. In this case, a dated password having an expiration date as a term when for example the work schedule and the operation schedule overlap each other is set. The first dated password thus set is sent to the cell phone and stored into the memory of the cell phone.

Plurality of first passwords are stored in the management apparatus. Of these passwords, a first password corresponding to a portable communications unit connected to the management apparatus is selected and sent to the portable communications unit. This operation is made per portable communications unit.

By individually connecting each portable communications unit to a construction machine, it is possible to operate the construction machine per connection of the portable communications unit.

The portable communications unit may be a cell phone and the telephone number of the cell phone may be stored as a second password. The second password may be data keyed into the operation section of a portable input device.

The portable communications unit and the body controller of the construction machine may perform communications via a serial interface or wireless communication.

BEST MODE FOR CARRYING OUT THE INVENTION

Embodiments of a security system for a construction machine according to the invention will be described with reference to the drawings.

First Embodiment

Figure 1:
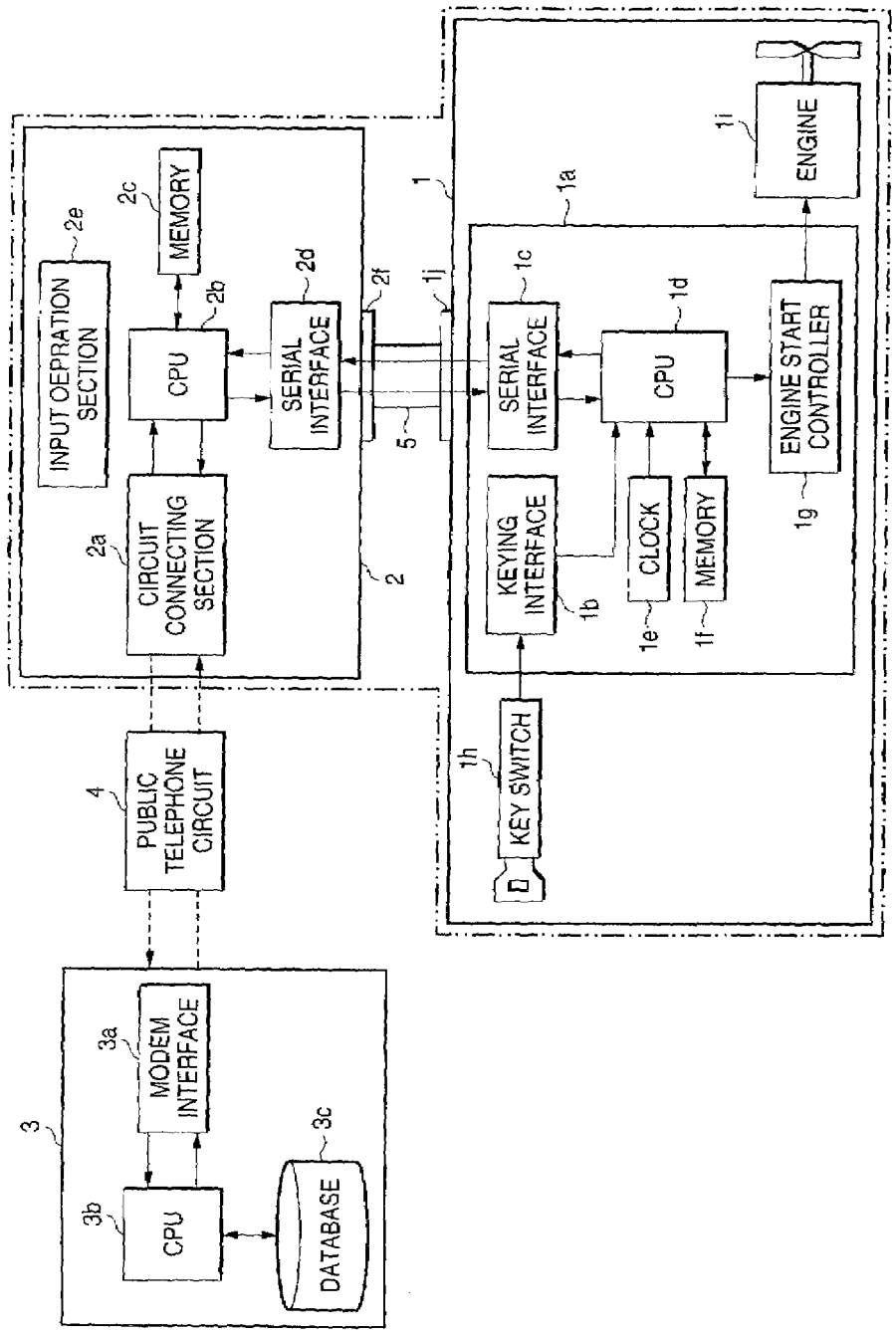
FIG. 1 is a block diagram showing a configuration of a first embodiment of a security system for a construction machine according to the invention.

FIG. 1 is a block diagram showing a configuration of a first embodiment of a security system for a construction machine according to the invention.

As shown in FIG. 1, the basic configuration of the first embodiment comprises management apparatus 3 for storing passwords, the management apparatus being arranged in a location apart from a construction machine such as a main unit 1 of a hydraulic excavator, a portable communications unit such as a cell phone 2 for storing predetermined passwords output from the management apparatus 3, the portable communications unit being connected to the management apparatus 3 via for example a public circuit 4, a body controller 1a provided on the main unit 1 of the construction machine, the body controller being connected to the cell phone 2 via a communications cable 5 and storing in advance the same password as a predetermined password stored in the management apparatus 3 as well as determining whether a predetermined password output from the cell phone 2 coincides with the password stored in advance, and outputting an engine drive signal in the event of matching.

The management apparatus 3 comprises a modem interface 3a constituting an input/output section. The management apparatus 3 also comprises a database 3c for storing a predetermined password and storing the telephone number of the cell phone 2 as well as the work schedule of the owner of the cell phone 2, for example the operator of the construction machine. The management apparatus 3 also comprises an arithmetic operation section or CPU 3b for recognizing the telephone number from a communication signal input from the modem interface 3a, selecting the predetermined password stored in the database 3c in accordance with the telephone number, checking the work schedule of the operator who owns the cell phone 2, and generating a dated password having an expiration date as a term corresponding to the work schedule. The modem interface 3a serves as an input section for inputting a communication signal output from then cell phone 2 via the public circuit 4 and an output section for automatically transmitting a dated password selected and dated by the CPU 3b to the cell phone 2 via the public circuit 4.

The cell phone 2 comprises a circuit connecting section 2a connected to the public circuit 4, a memory 2c for storing a dated password input from the circuit connecting section 2a, an input operation section 2e, an arithmetic operation section or CPU 2b for reading the dated password stored in the memory 2c in accordance with a request signal, which will be described later, output from the body controller 1a, and a serial communications interface 2d connected ton a communications cable 5.

The circuit connecting section 2a serves as a first output section for outputting the communication signal to the management apparatus 3 via the public circuit 4 and a first input section for inputting the communication signal containing a dated password output from the management apparatus 3 via the public circuit 4.

The serial communications interface 2d serves as a second input section for inputting a request signal output from the body controller 1a via the communications cable 5 and a second output section for outputting the dated password read by the CPU 2b to the body controller 1a via the communications cable 5.

The main unit 1 of the construction machine comprises an engine 1i, and an engine start instruction section for instructing start of the engine 1i such as a key switch 1h which is turned ON when detecting insertion of an engine key and outputting an instruction signal to the body controller 1a.

The body controller 1a comprises a memory 1f for storing the same password as that stored in the database 3c, a serial communications interface 1c connected to the communications cable 5, a keying interface 1b for inputting an instruction signal output from the key switch 1h, a clock 1e, an arithmetic operation section or CPU 1d for outputting a request signal in accordance with the instruction signal output from the key switch 1h, determining whether the dated password output from the serial communications interface 2d of the cell phone 2 coincides with the password stored in the memory 1f, determining whether the expiration date of the dated password output from the serial communications interface 2d includes the date and time indicated by the clock 1e, and outputs an engine drive permission signal when these two determinations are satisfied, and an engine start controller 1g for outputting an engine drive signal in accordance with the engine drive permission signal output from the CPU 1g.

The communications cable 5 is detachably attached to a connector 1j provided on the main unit 1 of the construction machine and a connector 2f provided on the cell phone 2. The cell phone 2 is retained in a location apart from the management apparatus, for example owned by an operator, when the construction machine is not operating. The cell phone 2 is connected to the main unit 1 of the construction machine when the construction machine is intended to be started.

Procedure performed in the first embodiment of this configuration will be described bellow.

Figure 2:
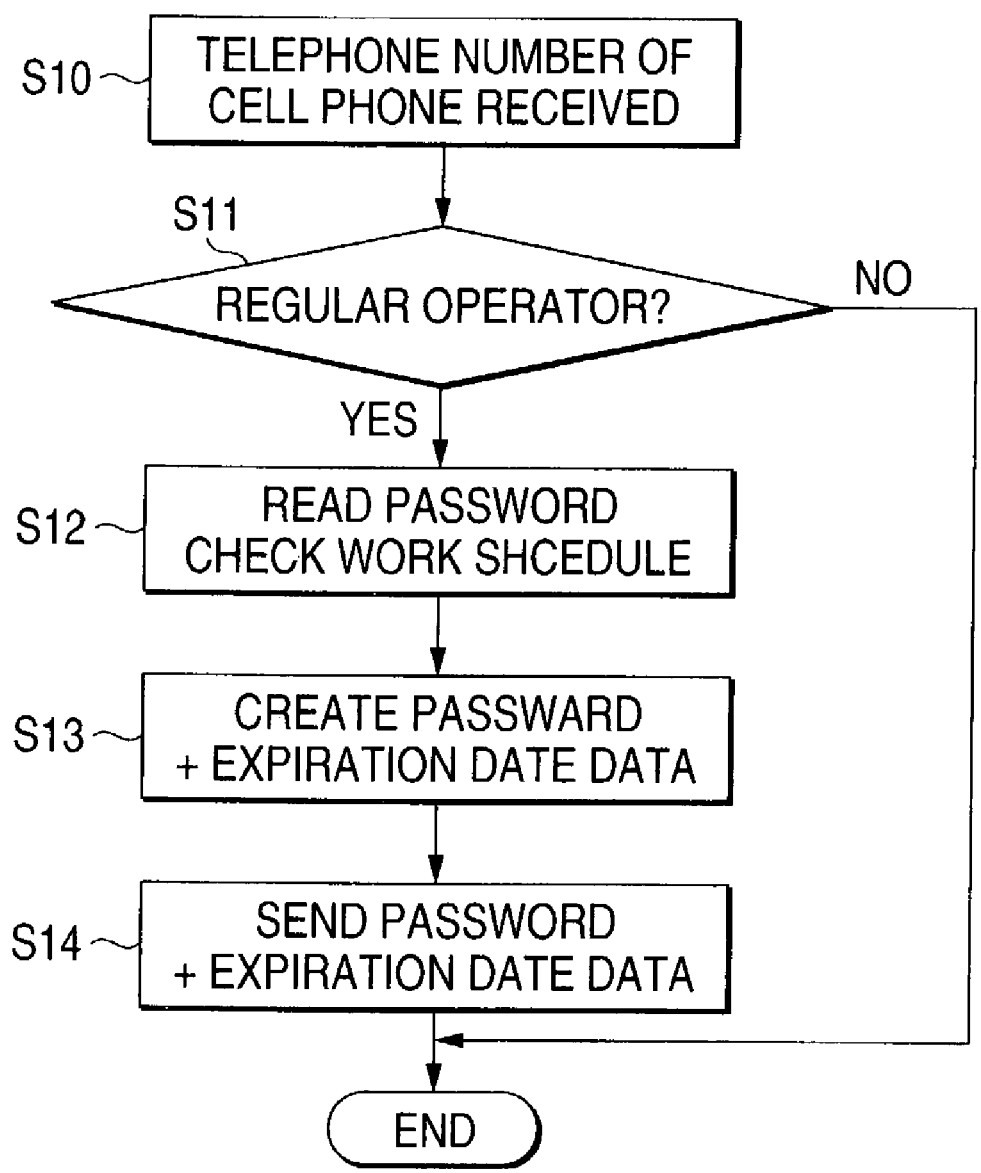
FIG. 2 is a flowchart showing a procedure in management apparatus provided in the first embodiment shown in FIG. 1.
Figure 3:
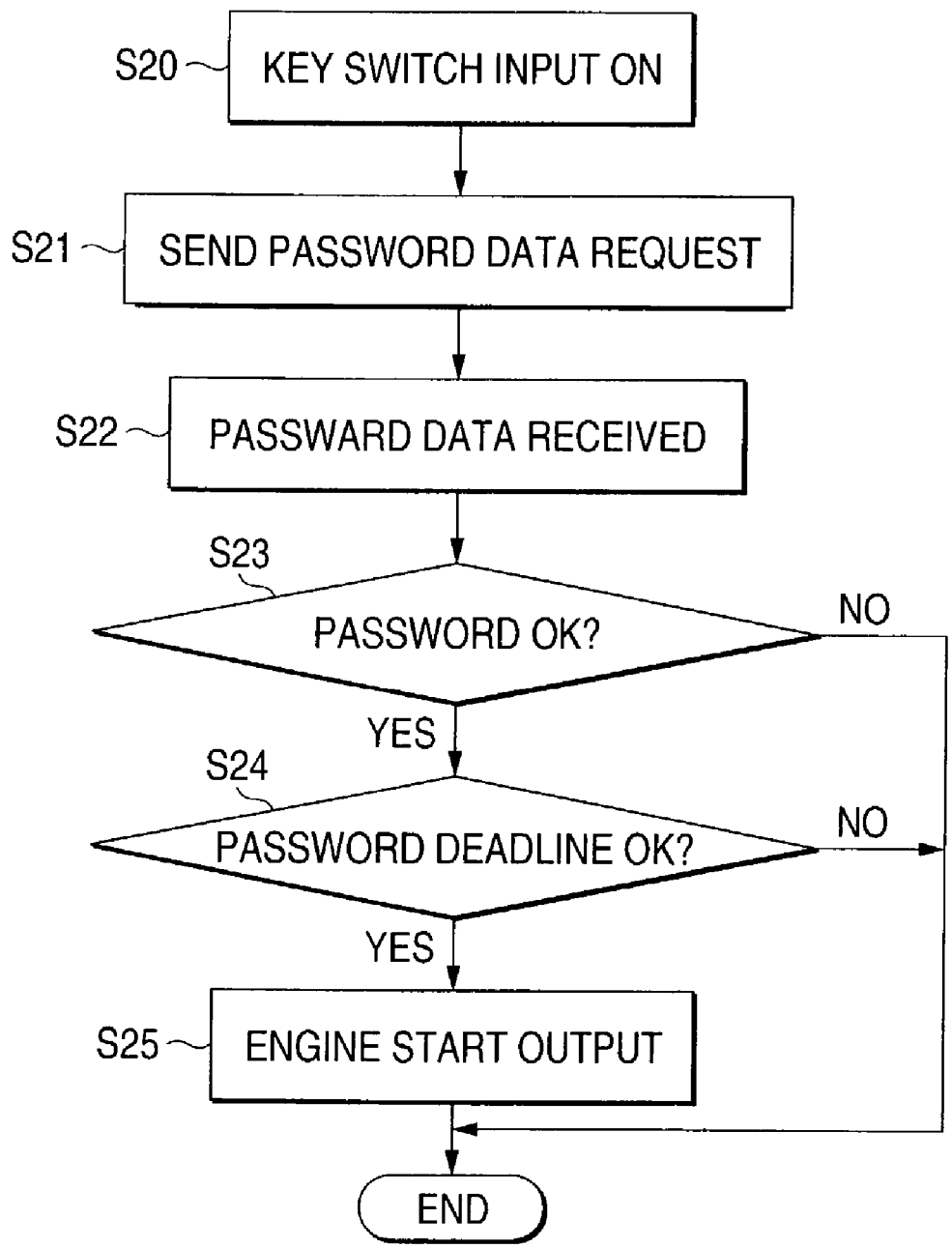
FIG. 3 is a flowchart showing a procedure in a body controller provided in the first embodiment shown in FIG. 1.

FIG. 2 is a flowchart showing the procedure in management apparatus provided in the first embodiment. FIG. 3 is a flowchart showing the procedure in a body controller provided in the first embodiment.

In the database 3c of the management apparatus 3 are stored in advance the telephone number of the cell phone 2 owned by the operator of the construction machine, the work schedule of the operator and a predetermined password, which are related to each other. In the memory 1f of the body controller 1a is stored in advance the same password as the predetermined password stored in the database 3c of the management apparatus 3.

In this state, when the input operation section 2e of the cell phone 2 owned by the operator is operated to input the telephone number of the management apparatus 3, the CPU 2b of the cell phone generates a communication signal and the communication signal is output to the public circuit 4 from the circuit connecting section 2a. The communication signal input to the modem interface 3a of the management apparatus 3 via the public circuit 4 is sent to the CPU 3b of the management apparatus 3.

As shown in Step S10 in FIG. 2, the telephone number of the cell phone 2 is recognized by the CPU 3b of the management apparatus 3 based on the communication signal. That is, the operator is identified.

Next, as shown in Step S11, stored details of the database 3c are referenced and it is determined whether the telephone number recognized in Step S10 is stored in the database 3c, that is, it is determined whether the telephone number is the regular operator's one.

In case the telephone number is not the telephone number of regular operator, that is, not stored in the database 3c, the procedure ends. In case it is determined that the telephone number is the telephone number of regular operator, execution proceeds to Step S12 and a password stored in relation to the telephone number and the work schedule of the operator are read by the CPU 3b.

In Step S13, a dated password having an expiration date as a term corresponding to the work schedule of the operator is set. In Step S14, the dated password set in this way is sent to the modem interface 3a from the CPU 3b, then to the CPU 2b via the public circuit 4 and the circuit connecting section 2a of the cell phone 2, and stored into the memory 2c by the CPU 2b.

The processing of storing a dated password in the memory 2c of the cell phone 2 may be done just before or several days before operation of the construction machine. In case communications between the cell phone 2 and the management apparatus 3 are disabled or expected to be disabled where the construction machine is located, the processing of storing a dated password in the memory 2c of the cell phone 2 may be done in a location apart from the construction machine where communications are allowed between the cell phone 2 and the management apparatus 3.

When a site worker such as an operator or a handler executes predetermined work using a construction machine or moves the construction machine for transportation, he/she connects a communications cable 5 between the connector 2f of the cell phone 2 and the connector 1j of the main unit 1 of the construction machine thus connecting the cell phone 2 to the main unit 1 of the construction machine. He/She inserts an engine key in this state.

This turns ON the key switch 1h as shown in Step S20 in FIG. 3 and causes an instruction signal to be input to the keying interface 1b of the body controller 1a then sent to the CPU 1d.

Next, as shown in Step S21, the CPU 1d generates a request signal for requesting password data in accordance with the instruction signal output from the key switch 1h. The request signal is sent to the serial communications interface 1c from the CPU 1d and output from the serial communications interface 1c.

The request signal is input to the serial communications interface of the cell phone 2 and sent to the CPU 2b of the cell phone 2. The CPU 2b reads the dated password stored in the memory 2c based on the input request signal. The dated password is sent from the CPU 2b to the serial communications interface 2d and output from the serial communications interface 2d. The dated password is entered to the serial communications interface 1c of the body controller 1a via the communications cable 5. The input dated password is sent to the CPU 1d of the body controller 1a, as shown in Step S22 in FIG. 3.

As shown in Step S23, the CPU 1d of the body controller 1a determines whether the input dated password coincides with the password stored in advance in the memory 1f. In case the CPU 1d has determined that the passwords do not coincide, an engine drive permission signal is not output. In case the CPU 1d has determined that the passwords do coincide with each other, execution proceeds to Step S24.

In Step S24, CPU 1d determines whether the expiration date of the input dated password is a valid one including the actual date and time indicated by the clock 1e. In case it is determined that the expiration date of the dated password does not include the actual date and is invalid, an engine drive permission signal is not output from the CPU 1d. In case it is determined that the expiration date of the dated password is valid, execution proceeds to Step S25.

In Step S25, the engine drive permission signal is output from the CPU 1d to an engine start controller 1g. Accordingly, an engine drive signal is output from the engine start controller 1g and the engine 1i is driven, allowing work by the construction machine.

In the first embodiment thus configured, in case the dated password input to the body controller 1a does not coincide with the password stored in the memory 1f, or in case the deadline of the dated password is not in the expiration date, an engine drive permission signal is not output, that is, an engine drive signal is not output from the engine start controller 1g and the engine 1i is kept inoperable thus driving of the construction machine is inhibited. As a result, the construction machine cannot be run. Passwords may be used in this way to prevent possible theft of a construction machine.

It is thus possible to implement automatic and remote-controlled input processing of passwords to drive a construction machine without intervention of a site worker such as an operator or a handler, by inserting an engine key with the cell phone 1 connected to the body controller 1a after conversation between the cell phone 2 and the management apparatus 3. This approach is not cumbersome or confusing to an operator but convenient as well as prevents leakage of a password and ensures a higher level of security.

In the first embodiment, the cell phone 2 and the body controller 1a are connected via the communications cable 5 and the serial communications interfaces 2d, 1c to provide serial communications. This ensures a high level of security for a dated password.

In the first embodiment, the request signal to request password data from the cell phone 2 is set by the operation of the key switch 1h, and the cell phone 2 reads a password from the memory 2c when receiving the request signal. But password data may be sent from the cell phone 2 when the cell phone 2 is connected to the construction machine 1.

While, in the first embodiment, the database 3c of the management apparatus 3 stores a predetermined password, the telephone number of the cell phone 2 owned by the operator of the construction machine, and the work schedule of the operator as the owner of the cell phone 2 related to each other, and the CPU 1d of the body controller 1a determines whether the input dated password coincides with the password stored in the memory 1f as well as whether the expiration date of the input dated password is a valid one including the date and time indicated by the clock 1e, and outputs an engine drive permission signal when these two determinations are satisfied, the invention is not limited to this configuration.

For example, in a situation where an operator can surly store a cell phone 2 availability of the construction machine operation by the operator or a handler is always required, the database 3c of the management apparatus 3 may only store a predetermined password and the CPU 3b of the management apparatus 3 may read the predetermined password stored in the database 3c in accordance with the communication signal output from the cell phone 2 and output the password from the modem interface 3a without setting the expiration date. The CPU 1d of the body controller 1a may only determine whether the password output from the cell phone 2 coincides with the password stored in the memory 1*f*, and when this determination is satisfied, may output an engine drive permission signal.

In such a configuration, the password has no expiration date so that an operator can operate the construction machine at a desired moment.

For example, in case the operation schedule of the construction machine is to be considered as well, the operation schedule of the construction machine with which the operator is related may be stored together with a predetermined password, the telephone number of the cell phone 2 owned by the operator of the construction machine, and the work schedule of the operator. And the CPU 3*d* of the management apparatus 3 may select the predetermined password stored in the database 3*c* in accordance with the recognized telephone number, determine the expiration date based on both the work schedule of the operator and the operation schedule of the construction machine, set a dated password corresponding to the expiration date. The CPU 1*d* of the body controller 1*a* may determine whether the input dated password coincides with the password stored in the memory 1*f* as well as whether the expiration date of the input dated password is a valid one including the date and time indicated by the clock 1*e*, and output an engine drive permission signal when these two determinations are satisfied.

In this configuration, the CPU 3*b* of the management apparatus 3 may set a dated password having an expiration date as a term when the work schedule of the operator and the operation schedule of the construction machine overlap each other, for example.

While a key switch 1*h* is provided as an engine start instruction section in the first embodiment, the invention is not limited to this configuration and may comprise a switch or pushbutton allowing output of an instruction signal through manual operation.

While a cell phone 1 is provided in the first embodiment, the invention is not limited to this configuration and may comprise for example a laptop PC.

In the first embodiment, a plurality of cell phones may be provided and the database 3*c* of the management apparatus 3 may store the telephone numbers of all cell phones 2 and passwords to be set in relation to each other, the memory 1*f* of the body controller 1*a* may store the same plurality of passwords as the plurality of passwords stored in the database 3*c* and determine whether the input password is included in the plurality of passwords stored in the memory 1*f* when the password input from the cell phone 2 is compared with the password stored in the memory 1*f*, and on determining that the input password is included, output an engine drive permission signal. In this configuration, for example a single construction machine may be operated by any one of a plurality of operators as required.

While the cell phone 2 and the management apparatus is connected via the public circuit 4 in the foregoing embodiment, the invention may be otherwise configured and use communications satellites.

While the cell phone 2 and the body controller 1*a* are connected via the communications cable 5, the invention may be otherwise configured and use wireless communication.

The management apparatus 3 may be provided for example in the building of a company which owns a construction machine.

Second Embodiment

A second embodiment will be described, in which the invention is applied to a security system for a hydraulic excavator, with reference to FIGS. 4 to 6.

Figure 4:
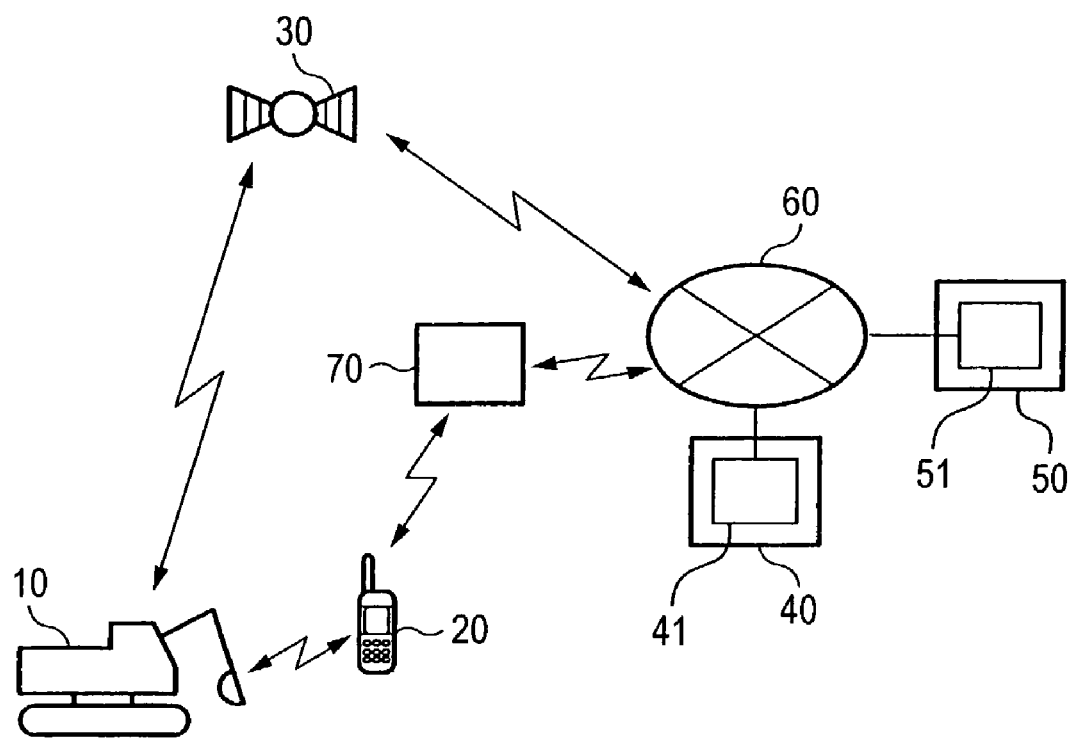
FIG. 4 is a block diagram showing a security system in second and third embodiments of the invention.
Figure 5:
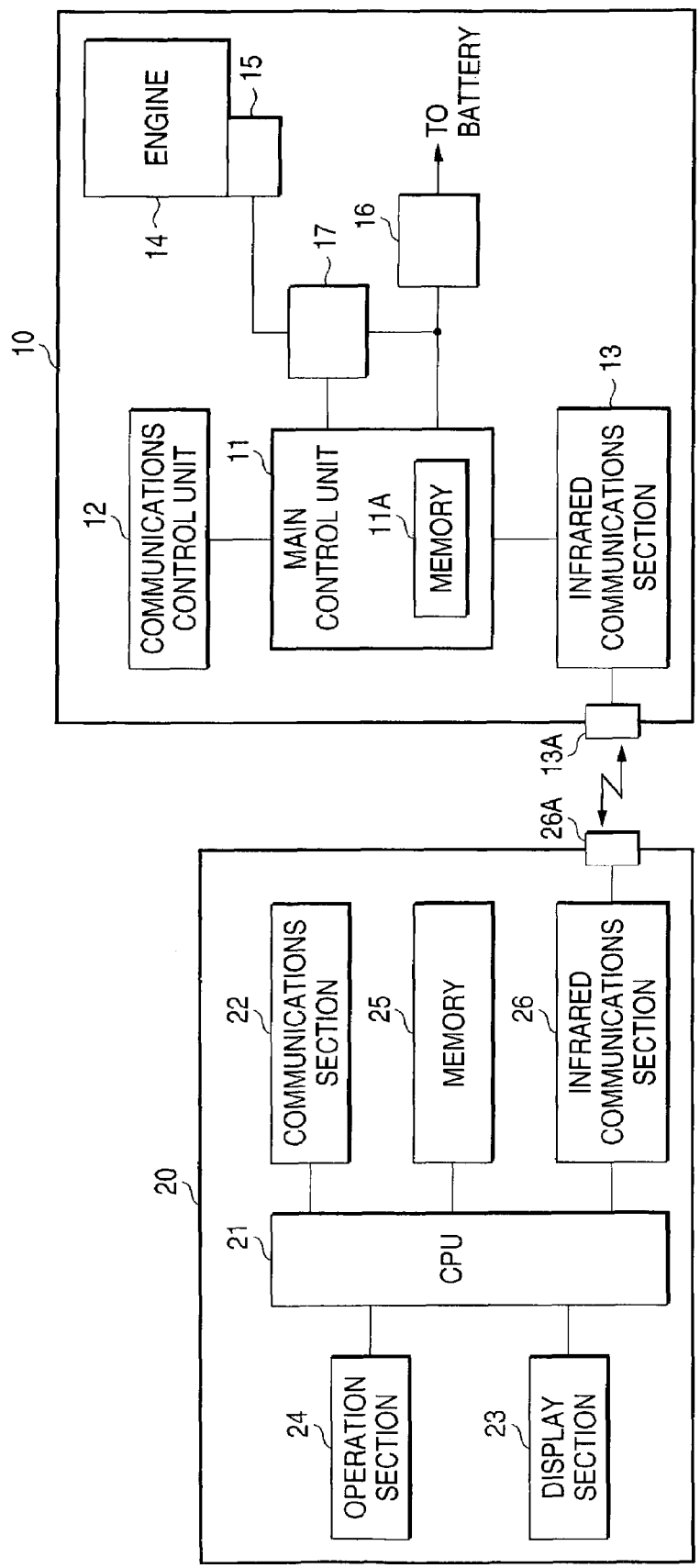
FIG. 5 is a block diagram showing a configuration of a control system of a hydraulic excavator and a cell phone.

FIG. 4 is a system block diagram in the second embodiment. FIG. 5 is a block diagram showing the configuration of a control system of a hydraulic excavator and a cell phone. In the second embodiment, a personal identification number (security data) is entered when an engine 14 of a hydraulic excavator is started. The hydraulic excavator 10 determines the validity of the security data and permits starting of the engine only when the security data is valid. The security data is entered from the cell phone 20.

To a main control unit 11 of the hydraulic excavator 10 are connected a communications control unit 12 and an infrared communications section 13. The communications control unit 12 performs two-way communications with a center server 41 of a construction machine maker (hereinafter simply called a maker) 40 via a communication satellite 30 and a communications circuit network 60. The center server 41 can communicate with a terminal 51 of a construction machine user 50 via the communications circuit 60.

An infrared communication section of a hydraulic excavator 10 performs two-way communications with the infrared communications section 13 of the cell phone 20 via communications ports 13A, 26A. The cell phone 20 further comprises a CPU 21, a communications section 22, a display section 23, an operation section 24, and a memory 25. The memory 25 stores the telephone number of the cell phone 20. The telephone number of the cell phone 20 serves as security data in the second embodiment. Thus, the telephone number of the cell phone 20 owned by the operator scheduled to use the hydraulic excavator 10 is stored as a personal identification number in a memory 11A on the hydraulic excavator 10.

Each operator of the hydraulic excavator 10 carries each cell phone 20.

A main control unit 11 switches ON/OFF of a starter relay 17 in accordance with the conditions. The starter relay 17 is interposed between a starter motor 15 of an engine 14 and an engine key switch 16. When the relay 17 is ON, the starter motor 15 is driven through operation of the key switch 16, thus starting the engine 14. When the relay 17 is OFF, the starter motor 15 is not energized even when the key switch 16 is operated and the engine 14 is not started.

Figure 6:
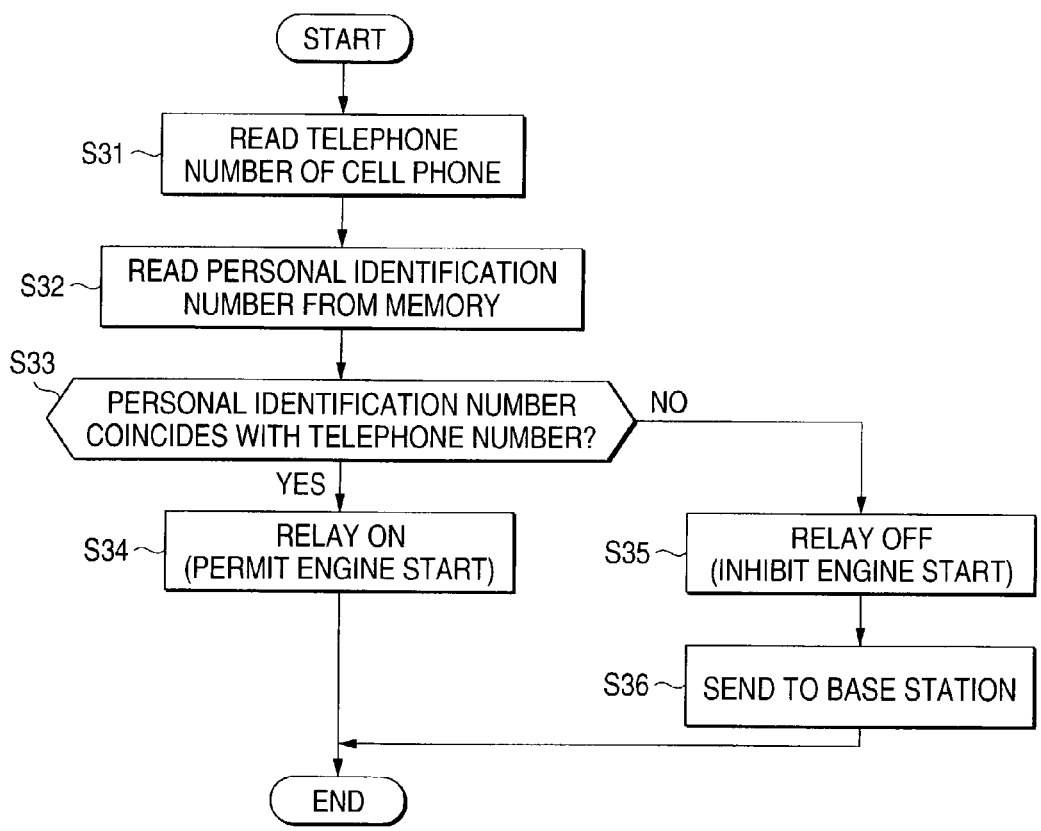
FIG. 6 is a flowchart showing a control on a hydraulic excavator in the second embodiment.

FIG. 6 shows the engine start procedure by the main control unit 11 of the hydraulic excavator 10. It is assumed that the cell phone 20 is set to support infrared communications with the main control unit 11.

When the engine key switch 16 is turned ON, the program is activated, reading the telephone number of the cell phone 20 via infrared communications (Step S31).

The telephone number of the cell phone 20 stored in the memory 25 of the cell phone 20 is entered to the main control unit 11 via the infrared communications sections 13, 26.

Then, the personal identification number stored in the memory 11A of the main control unit 11 is read (Step S32), and the personal identification number is compared with the telephone number from the cell phone 20 (Step S33). In case both coincide with each other, the starter relay 17 is turned ON to permit start of the engine 14 (Step S34). In case they do not coincide, it is determined that a person not authorized to use the hydraulic excavator 10 has made an attempt to start the engine 14 (possible theft), the starter relay 17 is turned OFF to inhibit start of the engine 14 (Step S35). In case start of the engine 14 is inhibited, information that there is a possibility of theft is sent via the communications control unit 12 Step S36). The send information is received by the center server 41 of the maker 40 via a communications satellite 10 and a communications circuit network 60.

Also in case the key switch 16 is operated without entering a personal identification number (telephone number) from the cell phone 20, Steps S35 and S36 are executed.

In the second embodiment, a personal identification number as security data of the hydraulic excavator 10 is entered from the cell phone 20. Each cell phone 20 is carried along by each operator for communications. Using the cell phone 20 for input of a personal identification number, a dedicated input device or card reader need not be installed, which reduces costs.

Especially in the second embodiment, a personal identification number to be input is stored in the memory 25 of the cell phone 20, so that the operator need not memorize the personal identification number and performs input easily, that is, there is no need to input a number using keys. The telephone number of the cell phone 20 serves as a personal identification number so that it is not necessary to input a personal identification number in the memory 25 of the cell phone 20.

Third Embodiment

A third embodiment of the invention will be described referring to FIGS. 4, 5, 7 and 8.

In the third embodiment, a personal identification number, which is different from a telephone number, is entered to the memory 25 of the cell phone 20. Setting and overwriting of the personal identification number is made by a maker 40 serving as a base station.

The cell phone 20 in the third embodiment can select an online service mode in addition to an ordinary telephone mode. This mode uses online services for telephones provided by telecommunications carriers. In the online service mode, the Internet connection and transmission/reception of e-mails are available via an online service provider 70 (FIG. 4) and a communications circuit network 60. In the third example, data is sent by accessing the center server 41 of the maker 40 or information sent from the maker 40 is received.

The operator of the hydraulic excavator 10 sets infrared communications available between the cell phone 20 owned by the operator and the main control unit 11 of the hydraulic excavator 10 then operates the engine key switch 16 when starting the hydraulic excavator 10. This causes the personal identification number stored in the memory 25 of the cell phone 20 to be fetched into the main control unit 11 and compared with the personal identification number stored in the memory 11*a* of the main control unit 11. In case both personal identification numbers coincide with each other, start of the engine 14 is permitted. Otherwise start of the engine 14 is inhibited.

Figure 7:
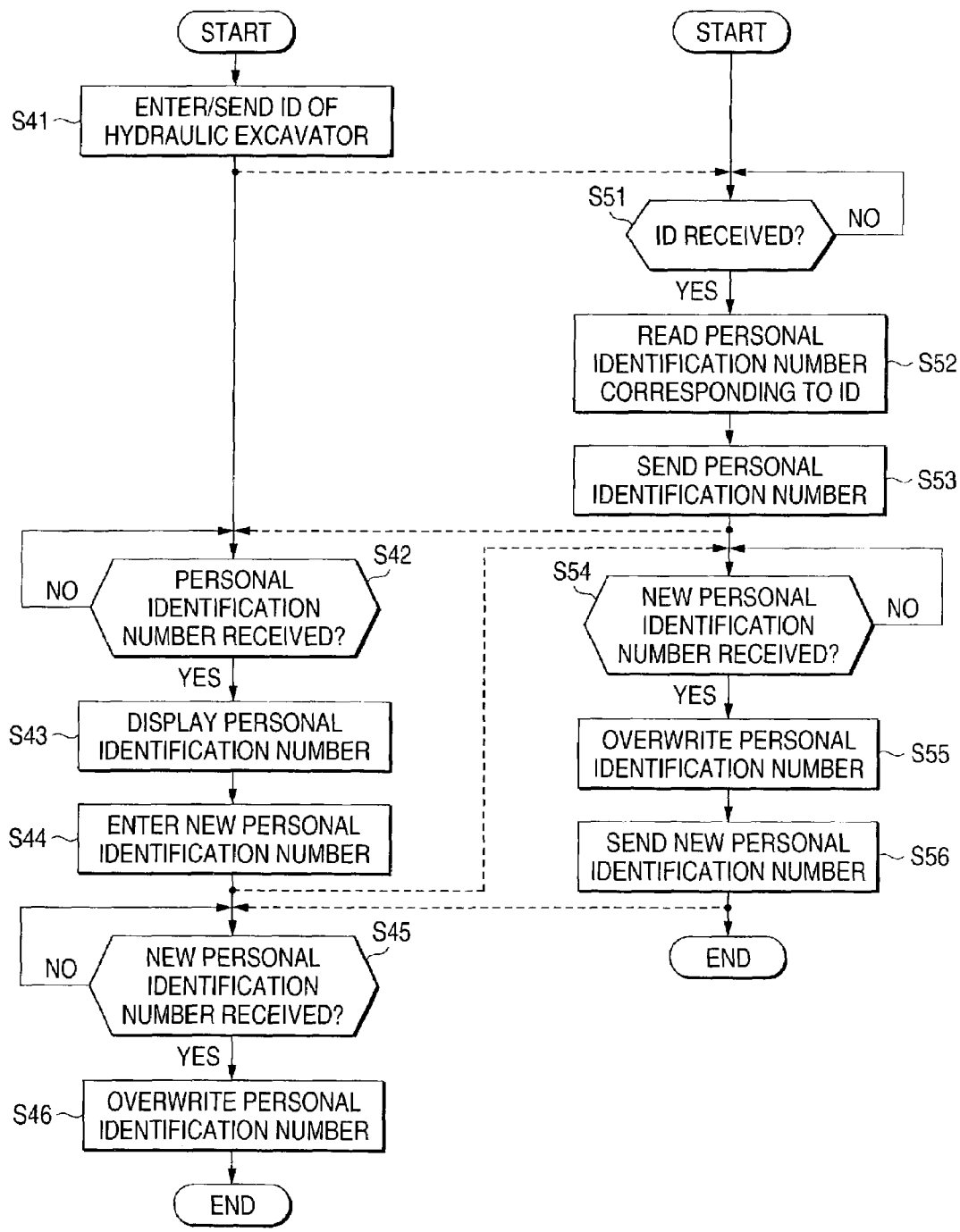
FIG. 7(a) is a flowchart showing a control of a cell phone in the third embodiment.
FIG. 7(B) is a flowchart showing a control of a center server in the third embodiment.

FIGS. 7(*a*), 7(B) are flowcharts showing the processing by the user 50 and the center server 41 in setting and changing the personal identification number. This processing is made executable by incorporating dedicated software into the cell phone 20.

A predetermined personal identification number change page is called on the cell phone 20 and a predetermined password is entered, then the ID number of the target hydraulic excavator 10 is entered and sent (Step S41). The center server 41, receiving the ID number sent from then cell phone 20 (Step S51), reads the personal identification number registered in relation to the ID number from a predetermined database (Step S52), and sends the personal identification number (Step S53). The cell phone 20, receiving a personal identification number from the center server 41 (Step S42), displays the personal identification number on a display section 23 (Step S43). This allows the user to recognize the current personal identification number.

In case a personal identification number is not yet set for the hydraulic excavator 10, the center server 41 sends a message that the personal identification number is not set, which message is displayed on the display section 23 of the cell phone 20.

Then, a new personal identification number is entered to the cell phone 20 and sent (Step S44). The new personal identification number may be arbitrarily selected by the operator of the cell phone 20. Note that the personal identification number of the memory 25 is not yet overwritten. The center server 41, receiving the new personal identification number sent (Step S54), overwrite the personal identification number in the database with a new personal identification number received or registers a personal identification number anew (Step S55). Then the center server 41 sends the new personal identification number to the cell phone 20 (Step S56). The cell phone 20, receiving a new personal identification number from the center server 41 (Step S45) overwrites the personal identification number in the memory 25 with the new personal identification number or registers a personal identification number anew (Step S46).

Processing shown in FIG. 7(*a*) may be done on the terminal 51 of the user 50 (personal computer).

By way of the processing in FIG. 7, overwriting (registration) of a personal identification number in the cell phone 20 is done in synchronization with overwriting (registration) of a personal identification number in the center server 41.

Note that the personal identification number on the hydraulic excavator 20 is not yet overwritten. This processing is done in FIG. 8 described next.

Figure 8:
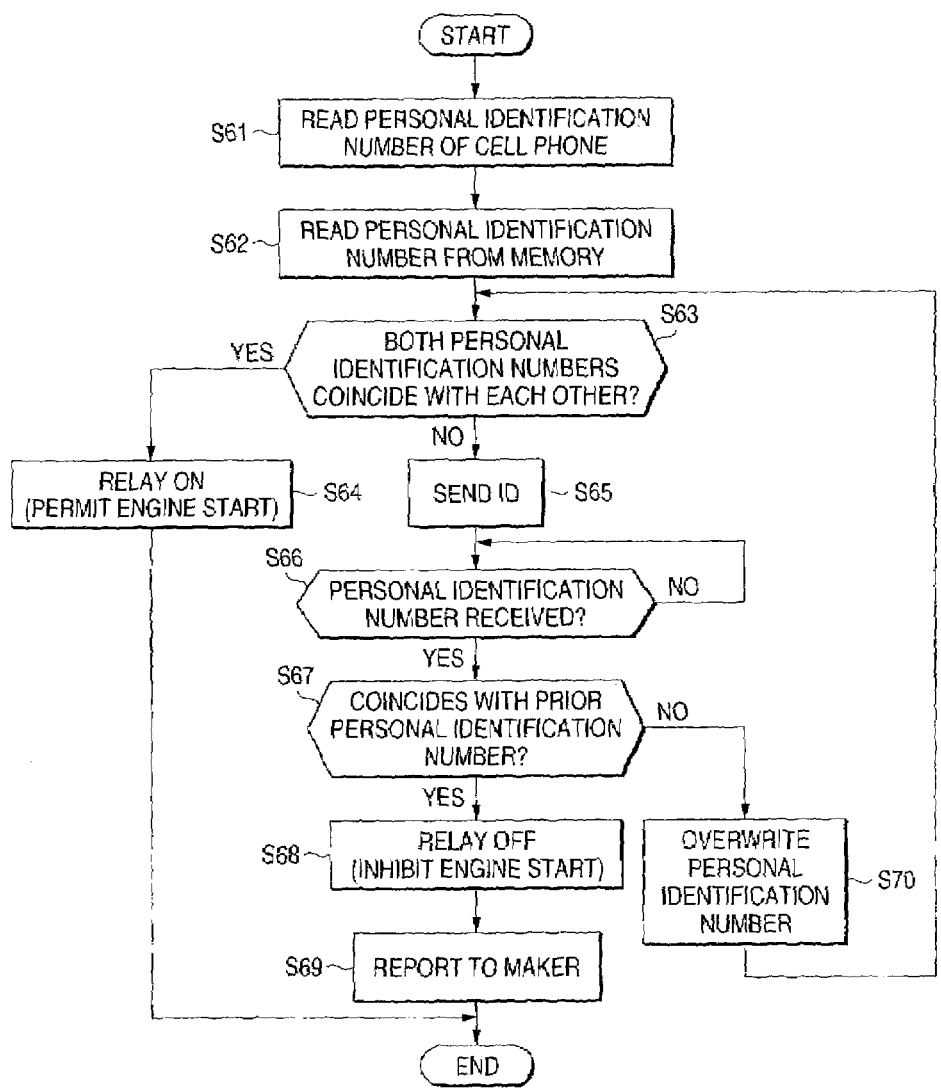
FIG. 8 is a flowchart showing a control on a hydraulic excavator in the third embodiment.

FIG. 8 shows engine start procedure by the control unit 11 of the hydraulic excavator 10.

The personal identification number stored in the memory 25 of the cell phone 20 is fetched (Step S61) and the personal identification number stored in the memory 11A of the main control unit 11 is read (Step S62). Both personal identification numbers are compared with each other (Step S63). In case both personal identification numbers coincide with each other, the starter relay 17 is turned on and start of the engine 14 is permitted (step S64). Otherwise execution proceeds to Step 65.

Here, the fact that both personal identification number do not coincide with each other corresponds to either a case where a person not authorized to use the hydraulic excavator 10 has made an attempt to start the engine 14 or a case where the personal identification number has been changed. In order to determine which case applies, the main control unit 11 sends the ID number (stored in the memory 11A in advance) of the hydraulic excavator 10 from the communications control unit 12 to the maker 40 and requests sending of the current personal identification number (Step S65). The center server 41 of the maker 40 sends back a personal identification number registered in relation to the ID number.

The main control unit 11, receiving a personal identification number sent from the center server 41 (Step S66), checks whether the received personal identification number coincides with the personal identification number stored in the memory 11A (Step S67). In case the personal identification numbers coincide with each other, the personal identification number has not been changed. The main control unit 11 determines that unmatch between personal identification numbers in Step S63 is due to the fact that a person not authorized to use the hydraulic excavator has made an attempt to start the engine 14. Then the main control unit 11 inhibits start of the engine 14 (Step S68) as well as sends the start of the engine is inhibited to the center server 41 (Step S69).

In case the personal identification number in the memory does not coincide with the received personal identification number in Step S67, the main control unit 11 determines that the personal identification number has been changed by the processing in FIG. 7, and overwrites the personal identification number in the memory 25 with the personal identification number fetched from the cell phone 20 (S70). Then, execution returns to Step S63 and the main control unit 11 compares the personal identification numbers. In Step S63 following Step S67, the personal identification numbers should be identical, execution proceeds to Step S64 to permit start of the engine 14.

In this way, personal identification numbers of the hydraulic excavator 10 and the cell phone 20 maybe automatically overwritten using the Web site of the maker 40 in this embodiment. There is no cumbersome procedure in an attempt to overwrite personal identification numbers.

While the foregoing example shows overwriting of both the personal identification number of the hydraulic excavator 10 and personal identification number of the cell phone 20, it is possible to overwrite only the personal identification number of the hydraulic excavator 10 to the personal identification number of the cell phone 20. In this case, after entering the ID number of the target hydraulic excavator 10 in Step S41 in FIG. 7A, the original personal identification number (number displayed in Step S43) is entered in Step S44. In this case, the personal identification number in the database of the maker 40 (personal identification number corresponding to the target hydraulic excavator 10) is overwritten but the personal identification number of the cell phone 20 is not substantially overwritten. Then, start operation for the target hydraulic excavator 10 causes the personal identification number to be automatically overwritten by the processing in FIG. 8. This allows a single operator to use a plurality of hydraulic excavators 10.

While the personal identification number stored in the memory 25 of the cell phone 20 is input to the hydraulic excavator 10 in the second and third embodiments, key operation on the operation section 24 of the cell phone 20 may be used to enter a personal identification number. In this case the operator must memorize the personal identification number but there is no need to register the personal identification number with the memory 25 of the cell phone 20. Change of an personal identification number in this case is required only for the hydraulic excavator 10, which procedure is automated using the Web site of the maker 40.

While infrared communications is used for entering an personal identification number from the cell phone 20, other wireless communications or wired communications with cable connected may be employed. The security data may be numerals, characters or signs, or a combination thereof. A Aersonal Digital Assistant (PDA) or a mobile computer may be used instead of a cell phone. Abase station is not limited to a construction machine maker but may be a construction machine rental company.

While the starter relay 17 is turned OFF to inhibit start of the engine 14 in case the personal identification numbers do not coincide in the foregoing example, a pilot hydraulic circuit may be interrupted to prevent the hydraulic excavator 10 from running, as described in the Japanese Patent Laid-Open No. 50584/1997. In particular, a switching valve (for example a solenoid valve) may be provided on the delivery circuit of each pilot hydraulic pump, and the switching valve maybe placed in the interrupting position out of an operable time zone or operable term and the switching valve may be placed in the communicating position otherwise. When the switching valve is placed in the interrupting position, operating each operation member does not drive each attachment or the actuator for swivel, including a hydraulic motor for traveling. This prevents possible theft of a construction machine.

While the invention has been described in detail referring to specific embodiments, the invention may be modified or corrected in various ways by those skilled in the art without departing from the spirit and scope of the invention.

This patent application is based on Japanese Patent Application filed Apr. 5, 2001 (Japanese Patent Application No. 2001-107464) and Japanese Patent Application filed Apr. 25, 2001 (Japanese Patent Application No. 2001-127128), the disclosures of which are incorporated herein by reference.

INDUSTRIAL APPLICABILITY

According to the invention, it is possible to implement automatic and remote-controlled input processing of passwords to drive a construction machine without intervention of a site worker such as an operator or a handler. This approach is not cumbersome or confusing to an operator but convenient as well as prevents leakage of a password and ensures a higher level of security.

What is claimed is:

1. A security system for a construction machine, comprising:
  a construction machine equipped with a body controller for storing a first password; and
  a portable communications unit for storing a second password,
  wherein
  the body controller determines whether the second password output from the portable communications unit coincides with the first password and inhibits a predetermined operation of the construction machine in the case of mismatch between the passwords;
  the system comprises a management apparatus for storing the first password and communicating with the body controller and the portable communications unit, the management apparatus being arranged in a location apart from the construction machine,
  upon receiving the first password from the management apparatus, the portable communications unit changes the second password to the first password;
  the predetermined operation of the construction machine is starting an engine installed on the construction machine,
  the construction machine comprises an engine start instruction section for instructing the body controller to start the engine,
  the management apparatus comprises an input section for receiving a communication signal output from the portable communications unit, a database for storing the first password, an arithmetic operation section for selecting the first password stored in the database in accordance with a communication signal received by the input section, and an output section for outputting the first password selected by the arithmetic operation section,
  the portable communications unit is owned by an operator of the construction machine and comprises a first output section for outputting the communication signal to the management apparatus, a first input section for receiving the first password output from the management apparatus, a memory for storing the first password received by the first input section as a second password, and a second output section for outputting the second password to the body controller, the body controller of the construction machine comprises a memory for storing in advance the first password stored in the database of the management apparatus, an input section for receiving the second password output from the second output section of the portable communications unit, an arithmetic operation section for determining whether the second password output from the second output section of the portable communications unit coincides with the first password stored in the memory of the body controller and outputting an engine drive permission signal when matching is made, and an engine start controller for outputting an engine drive signal in accordance with the engine drive permission signal output from the arithmetic operation section; and the portable communications unit and the management apparatus perform communications via a public circuit.

2. A security system for a construction machine according to claim 1, characterized in that the portable communications unit further comprises a second input section for receiving a predetermined request signal output from the body controller and an arithmetic operation section for reading the second password stored in the memory of the portable communications unit in accordance with the request signal output from the body controller, the body controller further comprises an output section for outputting the request signal to the second input section of the portable communications unit, the arithmetic operation section provided on the body controller performs processing to output the request signal in accordance with a signal output from the engine start instruction section for outputting an engine drive signal in accordance with the engine drive permission signal output from the arithmetic operation section.

3. A security system for a construction machine according to claim 2, characterized in that the engine start instruction section is a key switch for detecting insertion of an engine key.

4. A security system for a construction machine according to claim 1, characterized in that the portable communications unit is a cell phone, the management apparatus comprises a database for storing a telephone number of the cell phone and the first password in relation to each other.

5. A security system for a construction machine according to claim 1, characterized in that the first password is a dated password with a predetermined expiration date, the body controller comprises a clock, the arithmetic operation section of the body controller determines whether the dated password is valid or invalid based on the date and time indicated by the clock and inhibits starting of the engine when the arithmetic operation section has determined that the dated password is invalid.

6. A security system for a construction machine according to claim 5, characterized in that the management apparatus comprises a database for storing a telephone number of the cell phone, a work schedule of an owner of the cell phone and the first password, which are related to each other, and an arithmetic operation section for reading the work schedule of the owner related to the telephone number and stored in the database of the management apparatus in accordance with the telephone number of the cell phone recognized based on a communication signal input from the input section of the management apparatus, and setting a dated password having an expiration date corresponding to the work schedule.

7. A security system for a construction machine according to claim 5, characterized in that the management apparatus comprises a database for storing a telephone number of the cell phone, a work schedule of an owner of the cell phone, an operation schedule of the construction machine and the first password, which are related to each other, and an arithmetic operation section for reading the work schedule of the owner related to the telephone number and stored in the database of the management apparatus and the operation schedule of the construction machine in accordance with the telephone number of the cell phone recognized based on a communication signal input from the input section of the management apparatus, determining an expiration date based on both the work schedule of the owner and the operation schedule of the construction machine and setting a dated password corresponding to the expiration date.

8. A security system for a construction machine according to claim 1, comprising a plurality of portable communications units, characterized in that the management apparatus stores a plurality of first passwords.

9. A security system for a construction machine according to claim 1, characterized in that the portable communications unit is a cell phone and stores a telephone number of the cell phone as a second password.

10. A security system for a construction machine according to claim 1, characterized in that the second password is data keyed into an operation section of the portable communications unit.

11. A security system for a construction machine according to claim 1, characterized in that the portable communications unit and the body controller performs communications via a serial interface.

12. A security system for a construction machine according to claim 1, characterized in that the portable communications unit and the body controller perform wireless communications.

* * * * *